Figure 1:
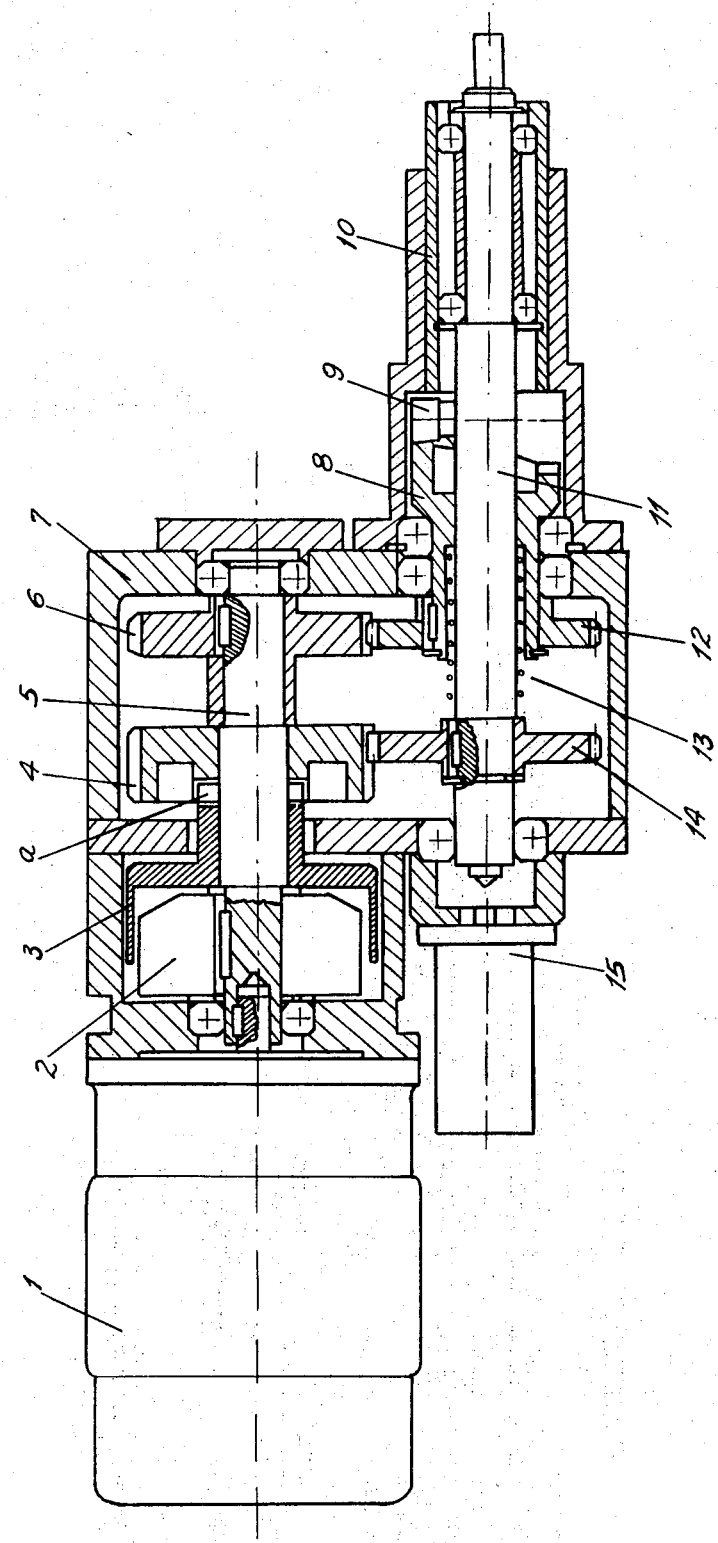

United States Patent [19]
Dimitrov

[11] 3,855,869
[45] Dec. 24, 1974

[54] DRIVEN ROTATABLE AND RECIPROCABLE SPINDLE OPERATING IN CYCLES OF SHORT DURATION

[76] Inventor: Lyudmil Vasilev Dimitrov, 40, Boul, Praga, Bulgaria

[22] Filed: Dec. 11, 1972

[21] Appl. No.: 314,256

[30] Foreign Application Priority Data
Dec. 10, 1971   Bulgaria.................................. 19212

[52] U.S. Cl............................................. 74/22 R
[51] Int. Cl............................................ F16h 27/00
[58] Field of Search................................ 74/22, 23

[56] References Cited
UNITED STATES PATENTS
| | | | |
|---|---|---|---|
| 1,934,044 | 11/1933 | De Leeuw | 74/22 |
| 2,949,789 | 8/1960 | Eminger | 74/23 |
| 3,433,082 | 3/1969 | Bitter et al. | 74/22 |
| 3,580,090 | 5/1971 | Bondarenko | 74/23 |
| 3,678,766 | 7/1972 | Geber | 74/23 |

Primary Examiner—Samuel Scott
Assistant Examiner—Wesley S. Ratliff, Jr.

[57] ABSTRACT

Driven rotatable, reciprocable spindle mechanism wherein the spindle operates with frequent cycles of short duration. The spindle is constantly rotated by a prime mover; fixedly connected to the spindle is a cam follower which coacts with an annular end cam mounted coaxial of the shaft and fixed in a direction axially of the shaft. Means is provided for selectively rotating the spindle and cam together at the same speed, whereby the spindle remains at a fixed axial position, and for rotating the spindle and cam at somewhat different speeds, whereby the spindle is reciprocated by the interaction of the cam follower and the cam.

7 Claims, 2 Drawing Figures

DRIVEN ROTATABLE AND RECIPROCABLE SPINDLE OPERATING IN CYCLES OF SHORT DURATION

This invention relates to a mechanism having a driven rotating reciprocable spindle which operates with frequent cycles of short duration; the mechanism of the invention is adapted for use with boring, drilling, grinding and polishing apparatus and the like.

In the machining of parts with combined, automatic machines such as turret lathes and the like, it is frequently required that the spindles of such apparatus shall operate in short working cycles which may vary from a part of a second up to a few seconds.

Driven spindles of the general type above indicated are known in which either the housing or the spindle is movable; the determination of the beginning and the end by the working cycle is effected by the switching on or off of the one or more operating motors.

In some of these known arrangements an electric motor is brought to a stand still at the end of each cycle, as for example by a mechanical brake, so that the spindle will be brought to a predetermined desired position and the working cycles of the apparatus will be shortened. In such apparatus the motor or motors employed must be of a special design, capable of starting and stopping at high speeds.

The fastest operating heads of such general type, in which spindles are started from a predetermined position and are returned to such position, are those in which it is not required that a motor be switched on and off during the whole working cycle. Among such latter known heads are those operated by pneumatic and pneumo-hydraulic means. The latter type of heads has a complicated operating mechanism, usually requiring a source of hydraulic fluids such as oil under pressure or a source of compressed air.

The invention has among its objects the provision of a driven spindle head operting in the above indicated manner, which permits operation of the spindle in a succession of cycles of short duration in which the spindle accurately returns repeatedly to a predetermined starting position; this is necessary, for example, for the synchronizing of a given spindle with the spindles of other units of a combined machine. The construction of the spindle of the invention is simple, economical of space, and economical to make and maintain.

In accordance with the invention, a spindle mounted for being rotatably driven and for reciprocation along its axis is provided with a cam follower affixed thereto. The cam follower coacts with an annular end cam mounted coaxially of the spindle and selectively driven for rotation at the same speed as the spindle or at a speed which is somewhat different from that of the spindle. When the cam and spindle operate at the same speed, the spindle remains in a predetermined fixed axial position. When the spindle operates at a speed somewhat different from that of the cam, the spindle is reciprocated by the cam, the latter being mounted for rotation in a fixed axial position. In the construction shown, the spindle is constantly rotated by an electric motor, whereas the cam is selectively coupled to the electric motor to be driven thereby at a speed somewhat different from that of the spindle through a selectively energized magnetic clutch. The magnetic clutch is controlled by a limit switch which is engaged by the spindle as the latter reaches one terminal axial position therof.

Figure 2:
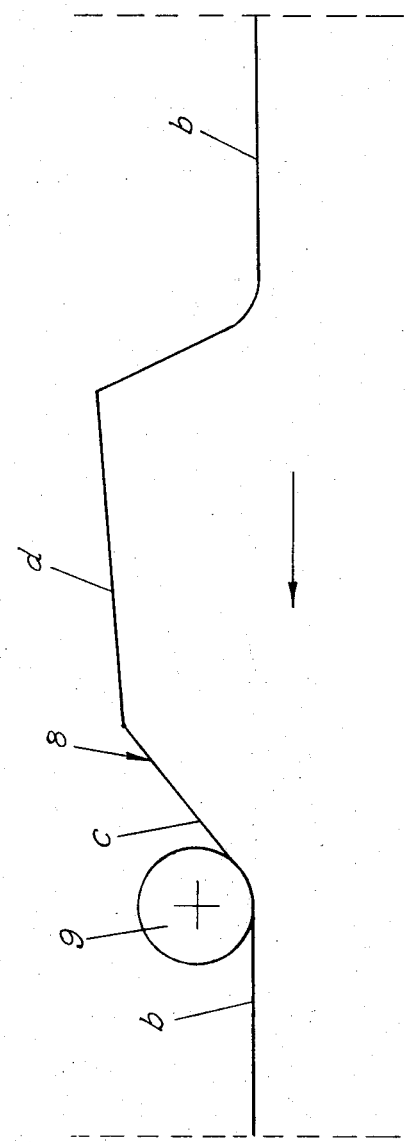

The invention will be more readily understood upon consideration of the accompanying drawings in which:

FIG. 1 is a view in longitudinal axial section through the spindle rotating and reciprocating mechanism of the invention; and FIG. 2 is a somewhat schematic, developed view of the end surface of the cam, the cam follower affixed to the spindle being shown disposed in a terminal axial position with respect to the cam.

An electric motor 1 is attached at an end thereof to the end of a main housing 7 in which there is rotatably mounted an axially fixed shaft 5 which is fixedly connected to the shaft of the motor as shown. A gear 6 is fixedly connected to the shaft 5 adjacent the right hand end of the shaft. A second gear 4 is mounted upon shaft 5 for free rotation with respect thereto, the gear 4 being prevented from axial movement along the shaft. Within the left-hand end of the housing 7 there is disposed an electromagnetic clutch 2, 3, the part 2 of the clutch being a schematically shown wound rotor, the winding of which is connected to slip rings (not shown), and the armature 3 of which is in the form of a bell the side wall of which is partially telescoped over the portion 2 of the clutch. The armature 3 of the clutch has a central sleeve portion, which is mounted upon and is freely rotatable with respect to the shaft 5, the right-hand end of such sleeve having a plurality of angularly spaced teeth $a$ which extend around the axis of the sleeve and which are interdigitated with similar angularly spaced teeth on the left-hand end of the hub of the gear 4. It will be seen that when the coil 2 of the clutch, which is fixedly connected to the shaft 5 so as constantly to rotate therewith, is de-energized, the armature 3 of the clutch and the gear 4 which is drivingly connected thereto rotate freely with respect to the shaft 5. When the coil 2 of the clutch is energized, however, the armature 3 of the clutch is caused to rotate with the coil, thereby rotatably driving the gear 4.

Affixed to one side of the main housing 7, at the bottom thereof as the apparatus is shown in FIG. 1, there is a sub-housing in which a spindle 11 is mounted for rotation parallel to the shaft 5. Spindle 11 is rotatably mounted in the sub-housing or sleeve 10, there being a gear 14 affixed to the spindle 11 adjacent its left-hand end, the gear 14 being in constant mesh with the gear 4. It is to be noted that the gear 4 is of greater width than both gears 6 and the gear 14, such greater width of the gear 4 permitting the spindle 11 to reciprocate, carrying with it the gear 14, while maintaining a meshing relationship between the gears 4 and 14. An end cam 8 in the form of a sleeve is telescoped about the spindle 11 and is rotatably mounted in the subhousing 10 in bearing which prevent its axial movement. A radially disposed cam follower roll 9 is fixedly connected to the spindle 11, the cam follower 9 being maintained in constant engagement with the end face of the cam 8 by coil compression spring 13 acting between the inner end of a counter bore in the cam 8 and the right-hand end surface of the hub of the gear 14. A gear 12, which is fixedly secured to the left-hand end of the cam 8, runs in constant mesh with the constantly driven gear 6. The left-hand end of the spindle 11 is provided with a central projection which engages the operating plunger of a switch 15 when the spindle 11 approaches its left-hand terminal position. The switch 15 is interposed in the energizing circuit for the coil 2 of the clutch, the coil 2 being energized when the parts are in the position shown in FIG. 1 and de-energized when the spindle 11 is in its left-hand terminal position.

The end surface of the cam 8 is shown developed in FIG. 2; as there is shown, such end surface of the cam has a part-annular portion $b$ which extends in a plain transversed to the axis of the cam 8 which, as we have seen, is constantly driven by the motor 1 through the shaft 5 the gear and the gear 12. The cam 8 rotates in a direction from right to left in FIG. 2. The end surface of the cam 8 has a steep incline $c$, a broad, slightly axially outwardly inclined surface $d$, and a sharp drop-off $e$ which merges with the transverse surface $b$ at its axially inner end.

The above-described apparatus of the invention operates as follows: When the coil 2 of the electro-magnetic clutch 2, 3 is de-energized, that is, when the spindle 11 lies at its left-hand terminal position, the cam follower roll 9 occupies the position shown in FIG. 2, that is, at the position wherein the end of surface $b$ of the cam merges with the axially inner end of the inclined portion $c$ thereof, and is held there by the coil compression spring 13. In such condition of the parts the driven cam 8 drives the cam follower 9 and thus, acting through the cam follower, rotates the spindle 11 at the same speed of rotation as the cam.

The ratio of the effective diameters of the gears 4 and 14 on the one hand and 6 and 12 on the other are made somewhat different, depending upon the operating charcteristics of the spindle 11 which are desired. Because of such difference effective diameter ratios, the gear wheel 4 rotates with respect to the shaft 5, and thus the armature 3 of the clutch 2, 3 rotates with respect to the coil 2 thereof. Although such relative rotation of the parts of the electro-magnetic clutch 2, 3 develops some friction, this is insufficient, if the spindle 11 is not under a retarding frictional force, to cause the cam follower 9 to mount the inclined surface $c$ of the cam 8, and so the spindle 11 rotates at the same speed as the cam 8.

The coil 2 of the electro-magnetic clutch may be energized from its source of energizing current (not shown) through a second supply circuit provided with a second switch (not shown) which is closed when the operating cycle of the spindle is to begin. Such second switch and the limit switch 15, above described, may be connected between the source of energizing current for the clutch 2, 3 in the manner of the well-known three-way switches employed in homes and offices. Thus, the second switch energizes the coil 2, such energization of the coil continuing until the supply circuit is broken by the opening of the limit switch 15.

When the coil 2 of the clutch 2,3 is energized, the gear 4 is driven and through meshing gear 14 drives the spindle 11 at a speed which is somewhat different from the speed of rotation of the cam 8. The cam follower 9 will now mount the incline $c$ of the cam 8 and will follow the profile of the cam so as to thrust the spindle 11 forwardly, that is to the right in FIG. 1. During such action the gear 14 slips axially of the gear 4, but remains in constant mesh with it. Assuming that the cycle of the spindle 11 is to be a single forward and then reverse movement, when the spindle 11 reaches its left-hand terminal position and thus opens the switch 15, the cam follower 9 will again be at the position thereof relative to the cam 8 shown in FIG. 2. The cycle is now at an end, and the spindle 11 is in position to begin another cycle of its operation when required.

In the above described embodiment of the apparatus of the invention the effective diameter ratios of gear set 4,14 and of gear set 6, 12 are such that, when the clutch 2,3 is energized and the parts thereof are locked together for rotation at the same speed the spindle 11 rotates at a predetermined speed which is less than the speed of rotation of the cam 8.

Although the invention is illustrated and described with reference to one preferred embodiment thereof, it is to be expressly understood that it is in no way limited to the disclosure of such a preferred embodiment, but is capable of numerous modifications within the scope of the appended claims. What is claimed is:

1. A driven spindle head adapted to be repeatedly operated in cycles of short duration, comprising a spindle, means mounting the spindle for rotation about its longitudinal axis and reciprocation along its longitudinal axis, a constantly rotating driving means, an end cam disposed coaxial of the spindle, means mounting the cam in a fixed position along its axis and for rotation about its axis, a transmission means connecting the driving means to the cam so as constantly to rotate the cam, a cam follower affixed to the spindle and cooperating with the cam to reciprocate the spindle when the cam rotates relative to the spindle, and means selectively to rotate the cam and spindle at the same speed and to rotate them at different speeds.

2. A spindle head according to claim 1, wherein the means selectively to rotate the cam and spindle at the same speed and to rotate them at different speeds comprises a second transmission, said second transmission extending between the driving means and the spindle, and selectively operated clutch means interposed in the second transmission, said first recited transmission and the second transmission when its clutch is operatively engaged driving the cam and spindle at different speeds.

3. A spindle head according to claim 2, wherein the cam has a transverse zone and a sharply inclined zone connected thereto at a transition zone, and comprising yieldable means constantly urging the cam follower against the cam with a force sufficient to maintain the transition zone of the cam in driving engagement with the cam follower when the clutch is disengaged.

4. A spindle head according to claim 2, wherein the two transmission means are gear trains.

5. A spindle head according to claim 2, comprising means to disengage the clutch when the spindle has reached a predetermined position in its cycle.

6. A spindle head according to claim 5, wherein the clutch is an electromagnetic clutch, and the means to disengage the clutch comprises a limit switch and a dog connected to move with the spindle so as to engage and open the switch to disenergize the clutch.

7. A spindle head according to claim 2, wherein the first transmission drives the cam at a greater speed than the spindle is driven by the second transmission when the clutch is engaged.

* * * * *